(12) United States Patent
Bengtsson et al.

(10) Patent No.: US 10,940,747 B2
(45) Date of Patent: Mar. 9, 2021

(54) LOCK BODY ASSEMBLY, POWER BATTERY, LOCKING MECHANISM THEREOF, METHOD OF USAGE, AND VEHICLE

(71) Applicant: NIO (ANHUI) HOLDING CO., LTD., Hefei (CN)

(72) Inventors: Jan Bengtsson, Hong Kong (CN); Nan Li, Hong Kong (CN)

(73) Assignee: NIO (ANHUI) HOLDING CO., LTD., Hefei (CN)

( * ) Notice: Subject to any disclaimer, the term of this patent is extended or adjusted under 35 U.S.C. 154(b) by 291 days.

(21) Appl. No.: 16/303,918

(22) PCT Filed: May 11, 2017

(86) PCT No.: PCT/CN2017/083971
§ 371 (c)(1),
(2) Date: Jan. 2, 2019

(87) PCT Pub. No.: WO2017/202210
PCT Pub. Date: Nov. 30, 2017

(65) Prior Publication Data
US 2020/0321572 A1    Oct. 8, 2020

(30) Foreign Application Priority Data
May 25, 2016    (CN) .......................... 201610350986.4

(51) Int. Cl.
*B60K 1/04*    (2019.01)
*H01M 2/10*    (2006.01)

(52) U.S. Cl.
CPC ............. *B60K 1/04* (2013.01); *H01M 2/1083* (2013.01); *H01M 2220/20* (2013.01)

(58) Field of Classification Search
CPC .... B60K 1/04; H01M 2220/20; H01M 2/1083
See application file for complete search history.

(56) References Cited

U.S. PATENT DOCUMENTS 4,087,895 A * 5/1978 Etienne .................. B60L 50/66
29/252
8,453,778 B2 * 6/2013 Bannier ................ H01M 2/024
180/68.5

(Continued)

FOREIGN PATENT DOCUMENTS

CN    202106830    1/2012
CN    102673361    9/2012

(Continued)

OTHER PUBLICATIONS

International Search Report prepared by the State Intellectual Property Office of the P.R. China dated Jul. 20, 2017, for International Application No. PCT/CN2017/083971.

(Continued)

*Primary Examiner* — John D Walters
*Assistant Examiner* — James J Triggs
(74) *Attorney, Agent, or Firm* — Sheridan Ross P.C.

(57) ABSTRACT

The invention relates to a lock assembly for a battery lock-up mechanism, a power battery comprising the lock assembly, a battery lock-up mechanism, a new energy vehicle, and a method for installing/detaching a power battery onto/from a new energy vehicle by using the battery lock-up mechanism of the invention. The lock assembly for battery lock-up mechanism comprises a casing and an stop end plate which define an accommodation space, in which a central pull shaft, an adjustment block and a return spring or the like are disposed. The return spring is sleeved over the central pull shaft. The technical solutions of the invention have a low cost, are easy to operate and are stable and reliable.

20 Claims, 4 Drawing Sheets

(56) References Cited

U.S. PATENT DOCUMENTS

| | | | | |
|---|---|---|---|---|
| 9,045,030 | B2* | 6/2015 | Rawlinson | B60L 50/66 |
| 9,821,645 | B2* | 11/2017 | Hayashi | B62D 25/20 |
| 9,937,818 | B2* | 4/2018 | Newman | H02J 7/0045 |
| 10,017,037 | B2* | 7/2018 | Newman | B60L 50/64 |
| 10,293,697 | B2* | 5/2019 | Goitsuka | B60L 53/16 |
| 10,611,408 | B2* | 4/2020 | Fritz | B62D 21/09 |
| 10,632,857 | B2* | 4/2020 | Matecki | B60K 1/04 |
| 2013/0156533 | A1 | 6/2013 | Yu et al. | |
| 2013/0180791 | A1 | 7/2013 | Lejeune et al. | |
| 2014/0165354 | A1* | 6/2014 | Ojima | B60L 53/80 |
| | | | | 29/281.1 |

FOREIGN PATENT DOCUMENTS

| | | |
|---|---|---|
| CN | 202413387 | 9/2012 |
| CN | 102903874 | 1/2013 |
| CN | 202847406 | 4/2013 |
| CN | 103108762 | 5/2013 |
| CN | 203254949 | 10/2013 |
| CN | 203543623 | 4/2014 |
| CN | 104022240 | 9/2014 |
| CN | 205800767 | 12/2016 |
| DE | 102009052525 | 5/2011 |
| DE | 102012219081 | 4/2014 |
| JP | 2013-133046 | 7/2013 |

OTHER PUBLICATIONS

Extended Search Report for European Patent Application No. 17802056.6, dated Dec. 11, 2019, 8 pages.
Official Action for European Patent Application No. 17802056.6, dated Jan. 10, 2020, 1 page.
Official Action for China Patent Application No. 201610350986.4, dated Dec. 27, 2017, 5 pages.

* cited by examiner

LOCK BODY ASSEMBLY, POWER BATTERY, LOCKING MECHANISM THEREOF, METHOD OF USAGE, AND VEHICLE

CROSS REFERENCE TO RELATED APPLICATIONS

This application is a national stage application under 35 U.S.C. 371 and claims the benefit of PCT Application No. PCT/CN2017/083971 having an international filing date of 11 May 2017, which designated the United States, which PCT application claimed the benefit of China Patent Application No. 201610350986.4 filed 25 May 2016, the disclosure of each of which are incorporated herein by reference.

FIELD OF THE INVENTION

The invention pertains to the technical field of new energy vehicle; in particular, the invention relates to a lock assembly for a battery lock-up mechanism of new energy vehicle, and further relates to a power battery comprising the lock assembly, a battery lock-up mechanism and a method of use, as well as a new energy vehicle comprising the battery lock-up mechanism.

BACKGROUND OF THE INVENTION

New energy vehicle has nowadays become a focus of research.

New energy automobile is a typical kind of new energy vehicle, in which the electrical energy of the battery is generally used to assist or replace a conventional internal combustion engine so as to provide power to the automobile. Hereinafter, the new energy automobile will be mainly used an example for description. It can be understood that similar description is also applicable to other kinds of new energy vehicles.

For existing plug-in new energy automobiles, the power batteries of the automobiles have problems that the time for waiting for charging is long, an inappropriate operation is apt to affect the service life of the battery, etc. Therefore, a battery swap new energy automobile relatively receives more favors from the users. Consumers of the battery swap new energy automobile do not have to wait for charging of the battery; instead, professionals at a battery swap station use professional devices to perform a quick battery swap operation on the automobile.

As a non-limiting example, the power battery of an existing battery swap new energy automobile is fixed to the body of the automobile (e.g., the chassis) through a battery lock-up mechanism. As can be seen, as compared with lock-up devices in other technical fields, the battery lock-up mechanism of a battery swap system of the new energy automobile, under the premise of cost control, also has to meet requirements on a convenient operation and a stable and reliable locking-up, thus bringing about new challenges to the design, manufacture and production. The same is true for other new energy vehicles.

SUMMARY OF THE INVENTION

An object of the invention is to provide a lock assembly for a battery lock-up mechanism of new energy vehicle, which has a low cost, is easy to operate and is stable and reliable. Further, the object of the invention is further to provide a power battery of automobile comprising the lock assembly, a battery lock-up mechanism and a method of use, as well as a new energy vehicle comprising the battery lock-up mechanism.

In order to achieve the above objects, a first aspect of the invention provides a lock assembly for a battery lock-up mechanism, and the battery lock-up mechanism further comprises a fixing assembly which is adapted to be connected to a new energy vehicle, the lock assembly comprising:

a casing having a cylindrical shape which is opened at a bottom end, and having a through hole at a top end;

an stop end plate, the stop end plate and the casing defining an accommodation space, a through-hole being formed in the stop end plate, and a first engaging portion being formed in an upper surface of the stop end plate;

a central pull shaft, an adjustment block and a return spring that are accommodated in the accommodation space, wherein the central pull shaft has a locking section, an adjustment section and a stop portion between the locking section and the adjustment section, the locking section protrudes from the through hole of the casing, but the stop portion is limited inside the accommodation space, the locking section has a first connection structure, and the locking section has a first engaging structure;

the adjustment block comprises a flange portion and an extension portion extending from a lower side face of the flange portion, a second engaging portion is formed on a lower side face of the flange portion, a through hole having a second engaging portion is formed longitudinally extending through the flange portion and the extension portion of the adjustment block, and the extension portion protrudes out of the accommodation space from the through hole of the stop end plate for facilitating operation, the return spring is sleeved over the adjustment section of the central pull shaft for urging the adjustment block towards the stop end plate; and the first engaging portion is adapted to engage with the second engaging portion for restricting a relative rotation of the stop end plate and the adjustment block in a circumferential direction in an indexed manner, the first engaging structure engages with the second engaging structure and restricts a relative rotation of the central pull shaft and the adjustment block in the circumferential direction, and the first connection structure is adapted to engage with the second connection structure on the fixing assembly for restricting a relative axial movement of the fixing assembly and the lock assembly.

Optionally, in the above described lock assembly, the stop portion of the central pull shaft is a circular flange.

Optionally, in the above described lock assembly, the first engaging portion and the second engaging portion are concave-convex structures that are complementary to each other in shape in an indexed manner.

Optionally, in the above described lock assembly, the first engaging structure and the second engaging structure form a key-groove connection.

Optionally, in the above described lock assembly, the first engaging structure and the second engaging structure are a spline structure and a keyway structure respectively that are mated with each other.

Optionally, in the above described lock assembly, the first engaging structure and the second engaging structure are an external thread structure and an inner thread structure that are mated with each other.

Optionally, in the above described lock assembly, spring seats are disposed on both ends of the return spring respectively, and the spring seats abut against a top end of the casing and a top face of the adjustment block respectively in the accommodation space.

Optionally, in the above described lock assembly, a washer is disposed in the through hole at the top end of the casing.

Optionally, in the above described lock assembly, the stop end plate engages with a bottom end of the casing.

In order to achieve the above objects, a second aspect of the invention provides a power battery for new energy vehicle, and a battery housing of the power battery is provided with the lock assembly according to any item of the above first aspect.

In order to achieve the above objects, a third aspect of the invention provides a battery lock-up mechanism which comprises a lock assembly adapted to be connected to a battery housing of a power battery for new energy vehicle, wherein the lock assembly is the lock assembly according to any item of the above first aspect, and the battery lock-up mechanism further comprises the fixing assembly adapted to be connected to the new energy vehicle.

Optionally, in the above described battery lock-up mechanism, the fixing assembly comprises a fixing frame and a locking plate, the locking plate is assembled to the new energy vehicle through the fixing frame, and the second connection structure is formed on the locking plate.

In order to achieve the above objects, a fourth aspect of the invention provides a new energy vehicle which comprises a power battery assembled using the battery lock-up mechanism according to any item of the above third aspect.

Optionally, in the above described new energy vehicle, the lock assembly is fixed to the power battery through an intermediate connector, the lock assembly is connected inside the intermediate connector through interference fit, and the intermediate connector is fixed to a battery housing of the power battery by welding.

Optionally, in the above described new energy vehicle, the intermediate connector is a circular sleeve which is welded inside a bore in the battery housing.

Optionally, in the above described new energy vehicle, the intermediate connector is a cast bracket adapted to be welded to a side face of the battery housing, and the cast bracket has a bore for accommodating the lock assembly.

Optionally, the above described new energy vehicle is a new energy automobile, and the fixing assembly is connected to a chassis of the body of the new energy automobile.

In order to achieve the above objects, a fourth aspect of the invention provides a method for installing/detaching a power battery onto/from a new energy vehicle by using the battery lock-up mechanism according to any item of the above third aspect, wherein the installing steps comprise: (1) aligning the power battery having the lock assembly for the battery lock-up mechanism with the fixing assembly on the new energy vehicle; (2) pushing the adjustment block upward so that the adjustment block is disengaged from the stop end plate, and then turning the adjustment block so as to drive the central pull shaft to engage with the locking plate; and (3) releasing the adjustment block when an appropriate locking angle or torque is reached so that the return spring pushes the adjustment block to return to a position for engaging with the stop end plate, thus restricting turning of the central pull shaft; and/or the detaching steps comprise: (1) pushing the adjustment block upward so that the adjustment block is disengaged from the stop end plate, and then turning the adjustment block so as to drive the central pull shaft to be disengaged from the locking plate; (2) releasing the adjustment block after the central pull shaft is disengaged from the locking plate so that the return spring pushes the adjustment block to return to a position for engaging with the stop end plate, thus restricting turning of the central pull shaft; and (3) moving the power battery having the lock assembly away from the fixing assembly.

BRIEF DESCRIPTION OF THE ACCOMPANYING DRAWINGS

The disclosure of the invention will become clearer with reference to the accompanying drawings. It should be understood that these drawings are merely provided for the purpose of illustration, and are not intended to limit the scope of protection of the invention. In the drawings.

DETAILED DESCRIPTION OF THE PREFERRED EMBODIMENTS

Specific embodiments of the invention will be described in detail below with reference to the accompanying drawings, in which identical reference signs denote identical or corresponding technical features.

Hereinafter, the application of a new energy automobile will be mainly described; it can be understood that such description equally applies to other new energy vehicles.

Figure 1:
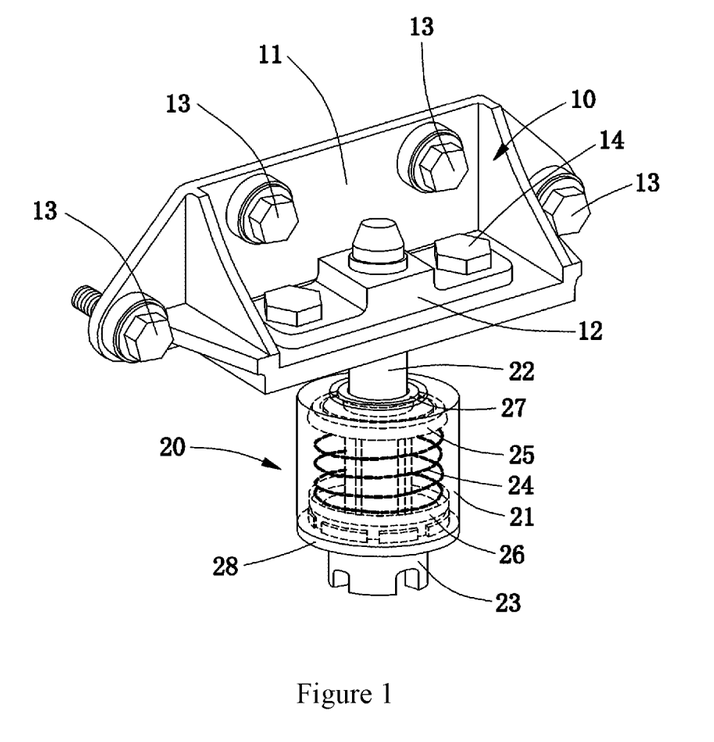
FIG. 1 is a schematic assembled perspective view of the battery lock-up mechanism according to an embodiment of the invention.
Figure 4:
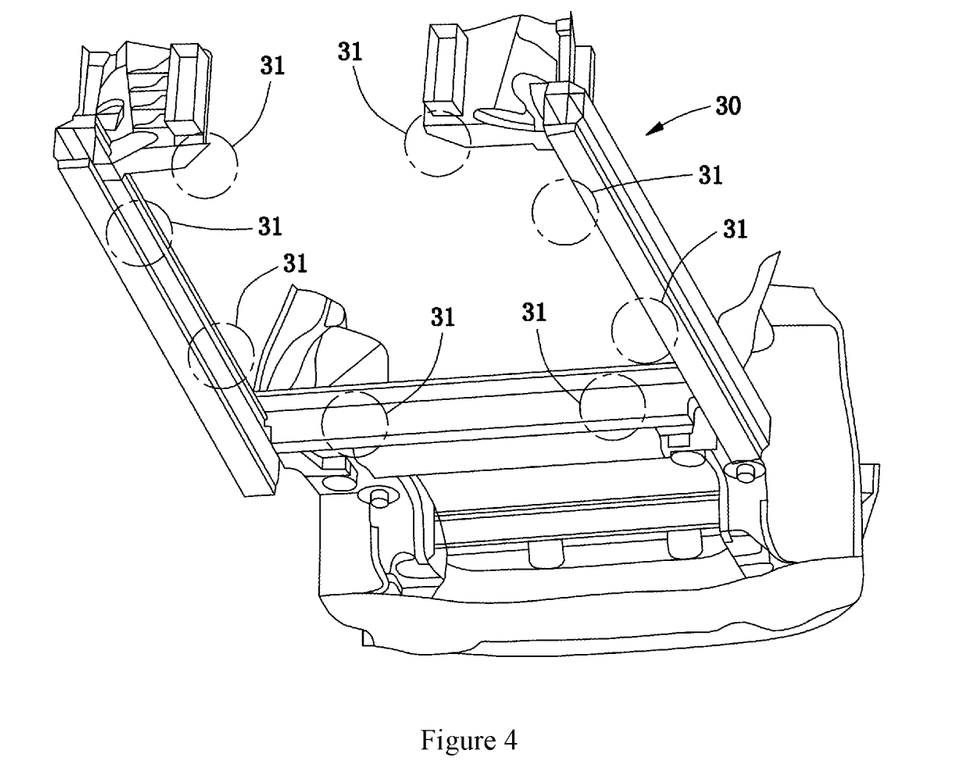
FIG. 4 is an example showing the arrangement of the battery lock-up mechanism on the chassis of automobile.

FIG. 1 is a schematic assembled perspective view of the battery lock-up mechanism according to an embodiment of the invention. As can be known, in a practical application, one or more similar battery lock-up mechanisms can arranged appropriately so as to fixedly install the power battery of an automobile (or other vehicles; the same applies below) to the body of the new energy automobile (or other new energy vehicles; the same applies below) in a detachable manner, e.g., the chassis of automobile. FIG. 4 shows an example of a specific arrangement of the connection positions (i.e., the encircled positions) of the battery lock-up mechanism on the body of the automobile.

While an example in which the power battery of automobile is assembled to the chassis of the body of automobile is described in the application, according to the teaching of the invention, those skilled in the art can envisage technical solutions of detachably installing the power battery to other possible suitable positions on the new energy automobile by using the battery lock-up mechanism of the invention, for example including but not limited to, trunk of the automobile, power cabin, etc.; installation at these positions will not be described in detail in the application document.

As can be seen from FIG. 1, the battery lock-up mechanism comprises a fixing assembly 10 and a lock assembly 20. The fixing assembly 10 is adapted to be connected to the body of the new energy automobile, whereas the lock assembly 20 is adapted to be connected to the battery housing of the power battery of the new energy automobile.

Therefore, when the lock assembly 20 is for example connected to the fixing assembly 10 through a central pull shaft 22 thereof, the battery lock-up mechanism locks-up the power battery of automobile to the body of the new energy automobile. When it is required to swap the battery, the battery lock-up mechanism can be unlocked and the power battery can be swapped for the automobile.

The fixing assembly 10 as shown can comprise a fixing frame 11 and a locking plate 12, wherein the fixing frame 11 is for example connected to an appropriate position on the body of automobile such as the chassis of automobile via four first bolts 13, and the locking plate 12 is connected to the fixing frame 11 via two second bolts 14. It can be understood that through holes or bolt holes for passing these bolts can be disposed in the fixing frame 11 and the locking plate 12 respectively. It can be understood by those skilled in the art that in an alternative embodiment, the fixing assembly can be also a single piece, e.g., it can be integrally formed by the fixing frame and the locking plate so that at least one assembling step can be omitted.

FIG. 1 also illustrates the constituent members of the lock assembly 20 of the battery lock-up mechanism, e.g., a casing 21 and an stop end plate 28 that define an accommodation space together, the central pull shaft 22 accommodated in the accommodation space, an adjustment block 23, a return spring 24, spring seats 25 and 26, a washer 27, etc. The internal structure of the lock assembly 20 is shown more clearly in FIG. 2. The battery lock-up mechanism in FIG. 1 is in a locked-up state, wherein the central pull shaft 22 of the lock assembly 20 is bolted to the locking plate 12 of the fixing assembly 10 so as to fix the power battery that is not shown to the body of automobile.

Figure 2:
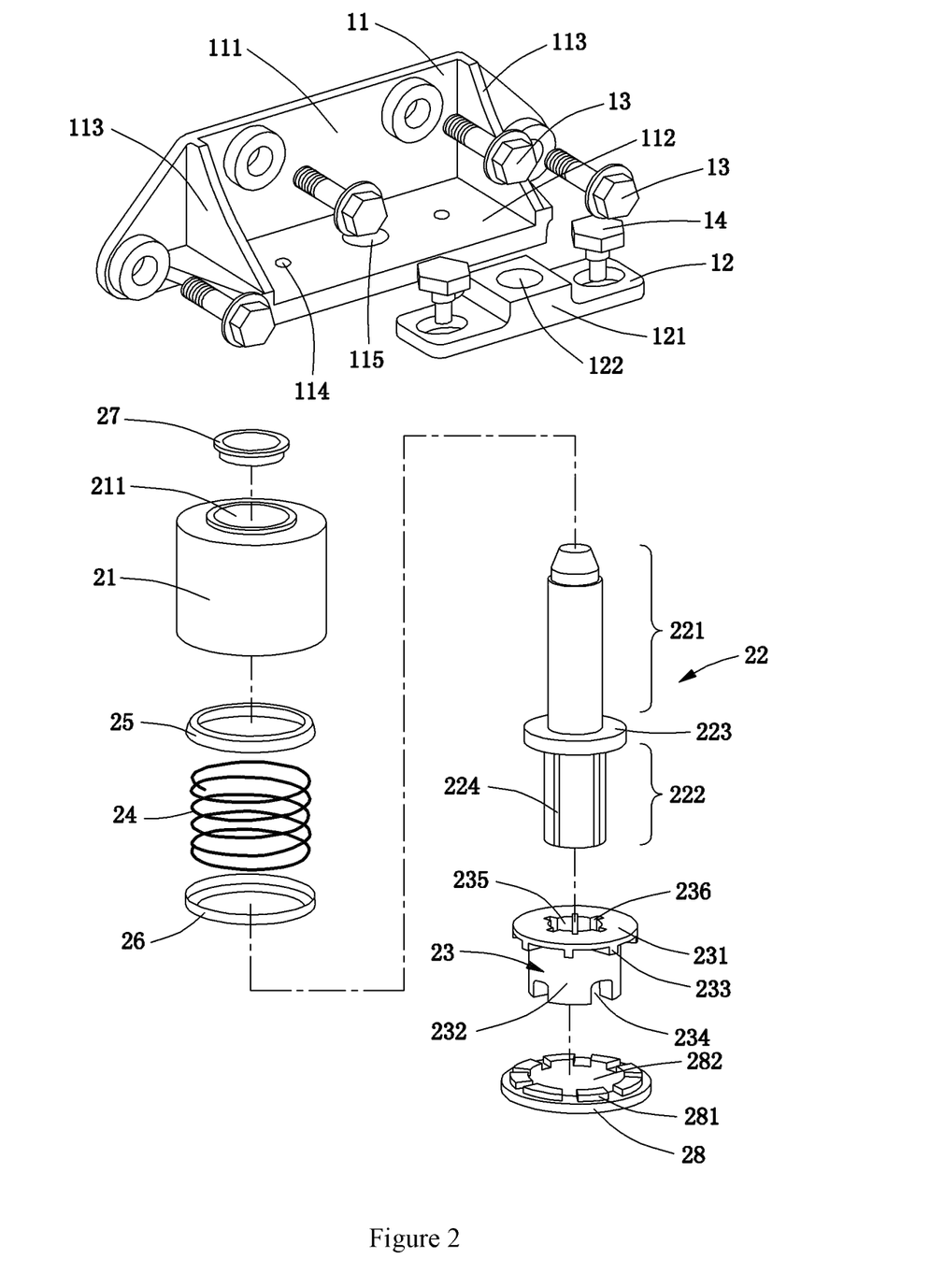
FIG. 2 is a schematic exploded perspective view of the battery lock-up mechanism in FIG. 1.

FIG. 2 is a schematic exploded perspective view of the battery lock-up mechanism in FIG. 1. With reference to this figure, the specific structures of various components of the battery lock-up mechanism as well as their interconnection relationships will be easily understood.

The fixing frame 11 as shown has a first side wall 111 and a second side wall 112 that are substantially perpendicular to each other. The first side wall 111 is provided with through holes that are adapted to be passed by the first bolts 13 so that the first side wall 111 can be connected to the body of automobile. The second side wall 112 is formed with two bolt holes 114 which are adapted to be passed by the second bolts 14 so as to fix the locking plate 12 of the battery lock-up mechanism. In order to reinforce the two side walls 111, 112, reinforcement ribs 113 can be formed between them. It can be understood that in different embodiments, the numbers and positions of the first bolts 13 and second bolts 14 and the respective through holes and bolt holes as well as the specific structure, number and positions of the reinforcement ribs 113 can be changed according to specific applications so as to realize a sufficiently stable and reliable connection.

Optionally, the locking plate 12 has a thickened portion 121 formed with a threaded hole 122 which is adapted to be connected to the central pull shaft 22 of the lock assembly 20 and locked together with the central pull shaft 22, thus fixing the battery in place. The thickened portion 121 has increased the connection strength of the locking plate 12 and the central pull shaft 22. The locking plate 12 is adapted to be connected to the second side wall 112 of the fixing frame 11 through the second bolts 14 and the second bolt holes 114. As such, such a connection enables the threaded hole 122 to be aligned with a through hole 15 in the second side wall 112 for passing the central pull shaft 22 and to be adapted to be connected with an external thread on a locking section of the central pull shaft 22.

Meanwhile, various members of the lock assembly 20 are shown more clearly in the drawings.

A periphery of the lock assembly 20 comprises a casing 21 and an stop end plate 28. In the illustrated example, the casing 21 is of a cylindrical shape, in which a top end is formed with a through hole 211 and a bottom end of completely open, thus facilitating assembling of the stop end plate 28. As an example, the casing 21 and the stop end plate 28 can be assembly together by way of for example, but not limited to, threaded connection, welding, snap fit or the like. With reference to FIG. 1, after assembly is completed, the casing 21 and the stop end plate 28 define the accommodation space, in which the central pull shaft 22, the return spring 24, the spring seats 25, 26 and the adjustment block 23 or the like are accommodated. In order to realize advantageous guidance and the functions of shocking absorbing and noise reducing, a washer 27 (e.g., which is made from rubber) is also optionally disposed inside a top through hole 211 of the casing 21; in addition, the function of the washer 27 further lies in fixing the central pull shaft after the power battery is detached, and meanwhile reducing the number of the turns of rotations of the central pull shaft when assembling the power battery. It can be understood that the washer 27 can be also omitted under the premise of reducing the cost while also meeting requirements on guidance as well as on shocking absorbing and noise reducing.

The central pull shaft 22 is disposed in the accommodation space. The central pull shaft 22 itself comprises a locking section 221, an adjustment section 222 and a stop portion between the locking section and the adjustment section. The stop portion prevents the central pull shaft 22 from falling off the top through hole 211 of the casing 21. In the illustrated example, the stop portion is in the form of a circular flange 223; obviously, those skilled in the art can envisage other forms of implementing the stop portion, which will also fall within the scope of the invention.

An outer surface at the top of the locking section 221 has an external thread for connecting to the threaded hole 122 in the fixing assembly 10 (e.g., in the locking plate 12). It can be understood that the threaded connection between the central pull shaft of the lock assembly and the locking plate of the fixing assembly herein is merely by way of example. Those skilled in the art can also envisage other connection modes in which the lock assembly has a first connection structure and the fixing assembly has a second connection structure. For example, they can be connected by hooks or the like. That is, a laterally disposed hanging plate which serves as the first connection structure can be provided on the locking section of the central pull shaft of the lock assembly (which is fixed onto the battery housing), and an elongated groove for passing the hanging plate is disposed on the locking plate of the fixing assembly (which is fixed onto the body of automobile). Herein, the locking plate serves as the second connection structure. After the hanging plate is rotated through the elongated groove by a certain angle, it is hooked on the locking plate, thus realizing locking-up. With reference to the illustrated embodiment, the first connection structure is an external thread structure, and the second connection structure is an internal thread structure.

The adjustment section 222 is used for performing a circumferentially turning operation on the central pull shaft 22 so as to execute locking-up action and unlocking action. In the illustrated example, the adjustment section 222 is formed with straight splines 224 so that the adjustment block 23 as shown can slide relatively along the adjustment section 222 through spline grooves 236 thereof, but a relative circumferential rotation of the adjustment section 222 and the adjustment block 23 is restricted. According to the teaching of the application, those skilled in the art can envisage applying other forms of mated key-groove connections herein. Further, those skilled in the art can envisage that the adjustment section 222 has a first engagement structure, and a through hole formed longitudinally extending through the flange portion 231 and the extension portion 232 of the adjustment block 23 has a second engagement structure, wherein the first engagement structure and the second engagement structure can restrict a relative circumferential rotation of the central pull shaft and the adjustment block, but do not restrict an axial sliding of them. The straight splines and the spline grooves in the figure are an example of the first engagement structure and the second engagement structure.

With reference to the embodiment of FIG. 1, when the central pull shaft 22 is installed inside the casing 21, the locking section 221 is adapted to pass through the through hole at the top of the casing 21, protrude out of the through hole, extend through an intermediate hole 115 in the second side wall 112 of the fixing frame 11, and be connected to the bolt hole 122 in the locking plate 12, whereas the circular flange 223 is restricted in the accommodation space constituted by the casing 21 and the stop end plate 28, and the adjustment section 222 is also accommodated in the accommodation space. The diameter of the circular flange 223 of the central pull shaft 22 is larger than that of the through hole at the top of the casing 21, and therefore the central pull shaft 22 will not fall out of the casing 21 from the through hole at the top of the casing 21. In this way, the central pull shaft 22 will pull the casing 21 tightly towards the fixing assembly 10 so that the lock assembly 20 tightly locks the battery to the body of automobile.

As shown in FIG. 2, the adjustment block 23 is formed thereon with a flange at the top, such as a circumferential flange 231, and an extension portion 232 extending downward from a lower side face of the flange. The adjustment block 23 is located inside the accommodation space. In order to prevent the adjustment block 23 from falling out of the accommodation space and to ensure that the adjustment block 23 can engage with the stop end plate 28, the outer diameter of the flange 231 is larger than the inner diameter of the through hole 282 in the stop end plate 28. Protrusions 233 are circumferentially distributed on a lower surface of the circumferential flange 231 so that the flange can mate with gaps between protrusions 281 on an upper surface of the stop end plate 28 in an indexed positioning, thus restricting a circumferential rotation between the adjustment block 23 and the stop end plate 28.

Those skilled in the art can also envisage using other engaging portions in place of the protrusions 233 of the adjustment block and the protrusions 281 on the stop end plate 28 (and the gaps thereof); for example, a first engaging portion can be formed on the surface of the stop end plate 28, and a second engaging portion can be formed on a lower side face of the flange of the adjustment block, as long as they are adapted to engage with each other and can restrict a relative circumferential movement of the stop end plate and the adjustment block in an indexed manner (but does not restrict a relative axial movement). The adjustment block and the stop end plate as shown illustrate concave-convex structures that can be complementary to each other in shape, and the adjustment block and the stop end plate can engage with each other at several angular positions along the circumference so as to restrict a relative circumferential movement of them.

The adjustment block 23 is also formed with an axial through hole 235 adapted for passing the adjustment section 222 of the central pull shaft 22, which penetrates through the entire adjustment block 23 comprising the flange 231 and the extension portion 232. The through hole 235 has spline grooves 236 adapted to mate with splines of the adjustment section 222. A lower end of the extension portion 232 of the adjustment block 23 is adapted to protrude out of the through hole 235 of the stop end plate 28, and structural features such as engaging grooves 234 can be formed at the bottom end for facilitating operation, so that professionals can make adjustments to the adjustment block 23 by using a dedicated tool.

The stop end plate 28 together with the casing 21 define the accommodation space, and in the illustrated example, the stop end plate 28 is optionally installed at a lower open end of the casing 21, e.g., at the bottom end. The stop end plate 28 can be installed onto the casing 21 in suitable ways, comprising for example but not limited to the following: in a threaded connection, the outer periphery of the stop end plate 28 is formed with an external thread for engaging with the internal thread at a lower open end of the casing 21; and the stop end plate 28 and a lower open end of the casing 21 can be welded together. An upper surface of the stop end plate 28 is formed with protrusions 281 distributed circumferentially, which are adapted to mate with the adjustment block 23 so as to perform indexed positioning. Specifically, the protrusions 233 on the adjustment block 23 can enter slots between the protrusions 281 on the stop end plate 28 so that the adjustment block 23 and the stop end plate 28 bite against each other, thus realizing a circumferential position of them.

It can be known from FIGS. 1 and 2 that a return spring 24 and upper and lower spring seats 25, 26 are also disposed inside the accommodation space. The return spring 24 is sleeved over the adjustment section of the central pull shaft and urges the adjustment block towards the stop end plate; as compared with a design in which the return spring is placed inside the central pull shaft, such a design of sleeving the return spring over the central pull shaft reduces the cost and facilitates assembling the lock assembly. Upper and lower ends of the two spring seats 25, 26 in the accommodation space abut against a top end (inner surface) of the casing 21 and a top face of the adjustment block 23 respectively, and both ends of the return spring 24 abut against the corresponding spring seats 25, 26. It can be understood that the a spring force of the return spring 24 pushes the adjustment block 23 towards the stop end plate 28; when the adjustment block 23 and the stop end plate 28 bite together, a circumferential rotation of the central pull shaft 22 is limited. Those skilled in the art can also envisage other forms of return element to replace the compression spring in the illustrated example.

Figure 3:
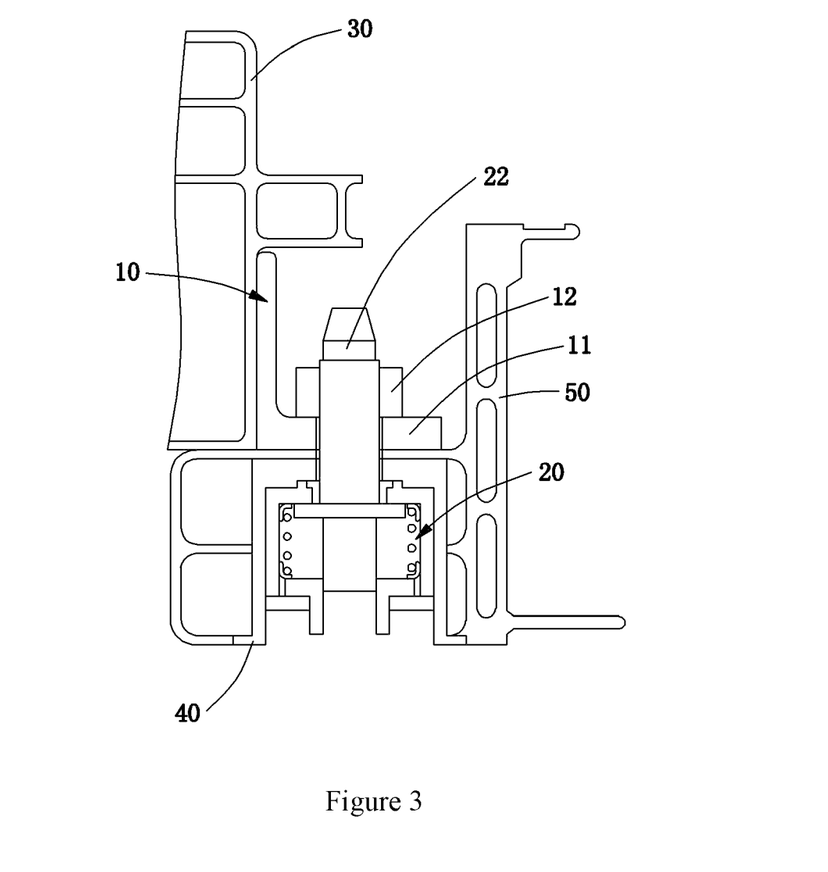
FIG. 3 is a schematic sectional view showing an installation method of the battery lock-up mechanism in FIG. 1.

FIG. 3 is a schematic sectional view showing an installation method of the battery lock-up mechanism in FIG. 1.

In FIG. 3, the fixing assembly 10 is connected to a chassis frame 30 of automobile through bolts (not shown), and the lock assembly 20 is fixed to a housing member 50 of the battery via a liner cylinder 40. In the locked position as shown, the section 221 of the central pull shaft 22 extends through the liner cylinder 40 and the fixing frame 11 so as to be connected together with the locking plate 12, thus fixing the battery to the body of automobile.

In an assembling method, the lock assembly 20 is firstly assembled to the liner cylinder 40 by interference fit, and then the liner cylinder 40 is welded to an installation hole of the housing member 50 of the battery. The installation hole can be made by casting or drilling in advance. For example, the lock assembly 20 and the liner cylinder 40 are assembled by induction shrink assembly method: when the lock assembly 20 is assembled to the liner cylinder 40, a heat induction coil can be wound around the liner cylinder 40 for performing induction heating on the liner cylinder 40; after the liner cylinder 40 is expanded due to being heated, the lock assembly 20 is nested within the liner cylinder 40; after a normal temperature is restored, the lock assembly 20 and the liner cylinder 40 are closely fixed together so as to realize tight interference fit. Optionally, during assembling, the lock assembly 20 can be also cooled in the meantime for shrinking, for further facilitating assembling the lock assembly 20 and the liner cylinder 40. When the liner cylinder 40 is welded to the battery housing, the welding spots can be advantageously distributed at the periphery of the bottom and open end of the liner cylinder 40.

FIG. 4 is an example showing the arrangement of the battery lock-up mechanism on the chassis of automobile. The encircled positions 31 in the figure are schematic positions of the battery lock-up mechanism. It can be seen that in the example, in order to ensure the stability of battery installation, a total of eight battery lock-up mechanisms are provided on the chassis frame 30, i.e., two in the front, two at the rear, two on the left and two on the right. Specifically, fixing assemblies are disposed at these corresponding positions on the chassis frame of automobile, and lock assemblies are disposed at corresponding positions on the power battery for automobile. In this way, after the power battery for automobile and the body of automobile are aligned, individual lock assemblies will align with corresponding fixing assemblies. It can be understood that in an alternative embodiment, those skilled in the art can install the battery lock-up mechanisms with another number and at other positions.

Figure 5:
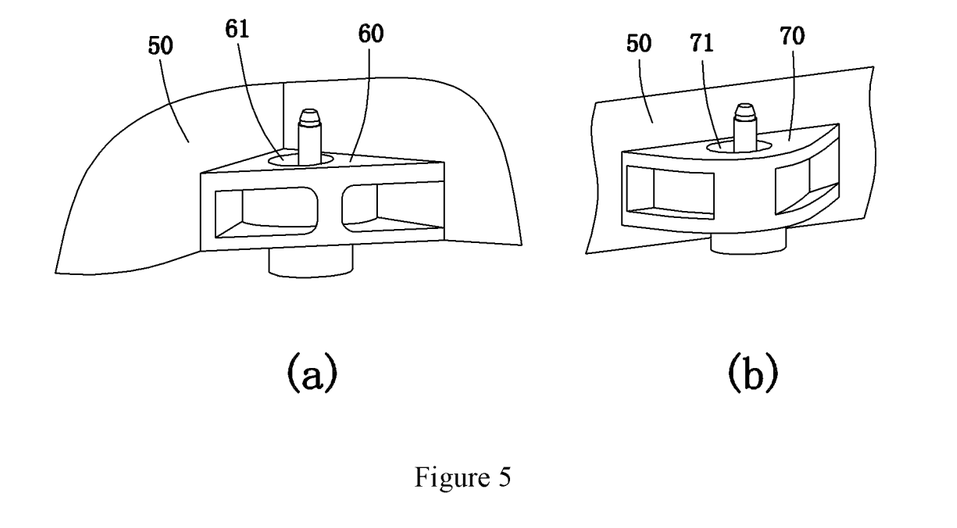
FIG. 5 is a schematic view showing an installation method of the lock assembly of the battery lock-up mechanism in FIG. 1.

FIG. 5 is a schematic view showing an installation method of the lock assembly of the battery lock-up mechanism in FIG. 1. As shown, there exists no condition for providing an installation hole at the shown position itself where the battery is located. In this case, in the invention, a cast block 60 or 70 is advantageously employed, and is welded to the housing member 50 of the battery. Then, through holes 61, 71 are formed in the cast block 60 or 70 by means of drilling or the like, which correspond to the positions of the fixing assemblies on the body of automobile and are adapted to install the lock assemblies. It can be understood that under the premise of ensuring positional accuracy, it is also possible to machine through holes 61, 71 in the cast block 60 or 70 firstly, and then to perform welding operation. As can be seen from the figure, the cast block 60 is suitable for a situation in which the lock assemblies are provided at the corners of the housing member of battery, and the cast block 70 is suitable for a situation in which the lock assemblies are provided in the plane of the housing member of battery. It can be known from the description of the application and the illustration of FIG. 5 that the application has taught a power battery for new energy automobile, and the battery housing of the power battery for automobile can be provided with the above described lock assembly.

In combination with the above detailed description, it can be known that the method for installing/detaching a power battery for automobile onto/from a new energy automobile by using the battery lock-up mechanism according to the illustrated embodiment of the invention comprises (but is not limited to) the following steps: wherein the installing steps comprise: (1) aligning the power battery for automobile having the lock assembly for the battery lock-up mechanism with the fixing assembly on the body of the new energy automobile; (2) pushing the adjustment block upward (by professionals or dedicated tools) so that the adjustment block is disengaged from the stop end plate, and then turning the adjustment block so as to drive the central pull shaft to engage with the locking plate; and (3) releasing the adjustment block when an appropriate locking angle or torque is reached so that the return spring pushes the adjustment block to return to a position for engaging with the stop end plate, thus restricting turning of the central pull shaft; and/or the detaching steps comprise: (1) pushing the adjustment block upward (by professionals or dedicated tools) so that the adjustment block is disengaged from the stop end plate, and then turning the adjustment block so as to drive the central pull shaft to be disengaged from the locking plate; (2) releasing the adjustment block after the central pull shaft is disengaged from the locking plate so that the return spring pushes the adjustment block to return to a position for engaging with the stop end plate, thus restricting turning of the central pull shaft; and (3) moving the power battery for automobile having the lock assembly away from the fixing assembly of the body of automobile.

In combination with the above description, it can be known that the application further teaches a new energy automobile comprising the above described lock assembly, and meanwhile further teaches a new energy automobile comprising the above described battery lock-up mechanism, which comprises a power battery for automobile fixed to the body of automobile through the battery lock-up mechanism. With reference to FIGS. 3 and 5, the lock assembly is fixed to the power battery for automobile through an intermediate connector, and the lock assembly is fixed inside the intermediate connector through interference fit. The intermediate connector can be fixed to the battery housing of the power battery for automobile by welding. Specifically, the intermediate connector is a circular sleeve which is welded inside a bore in the battery housing. Alternatively, the intermediate connector can be a cast bracket adapted to be welded to a side face of the battery housing, and the cast bracket has a bore for accommodating the lock assembly.

On this basis, those skilled in the art can easily obtain other types of new energy vehicles comprising the same lock assembly or battery lock-up mechanism according to the example of new energy automobile.

The technical scope of the invention is not merely limited to the content of the above description, and those skilled in the art can make various variations and modifications on the above embodiments under the premise of not departing from the technical ideas of the invention, all of which will fall within the scope of the invention.

What is claimed is:

1. A lock assembly for a battery lock-up mechanism, characterized in that the battery lock-up mechanism further comprises a fixing assembly which is adapted to be connected to a new energy vehicle, the lock assembly comprising:
  a casing having a cylindrical shape which is opened at a bottom end, and having a through hole at a top end;
  a stop end plate, the stop end plate and the casing defining an accommodation space, a through-hole being formed in the stop end plate, and a first engaging portion being formed in an upper surface of the stop end plate;
  a central pull shaft, an adjustment block and a return spring that are accommodated in the accommodation space, wherein the central pull shaft has a locking section, an adjustment section and a stop portion between the locking section and the adjustment section, the locking section protrudes from the through hole of the casing, but the stop portion is limited inside the accommodation space, the locking section has a first connection structure, and the locking section has a first engaging structure;

the adjustment block comprises a flange portion and an extension portion extending from a lower side face of the flange portion, a second engaging portion is formed on a lower side face of the flange portion, a through hole having a second engaging portion is formed longitudinally extending through the flange portion and the extension portion of the adjustment block, and the extension portion protrudes out of the accommodation space from the through hole of the stop end plate for facilitating operation, the return spring is sleeved over the adjustment section of the central pull shaft for urging the adjustment block towards the stop end plate; and the first engaging portion is adapted to engage with the second engaging portion for restricting a relative rotation of the stop end plate and the adjustment block in a circumferential direction in an indexed manner, the first engaging structure engages with the second engaging structure and restricts a relative rotation of the central pull shaft and the adjustment block in the circumferential direction, and the first connection structure is adapted to engage with the second connection structure on the fixing assembly for restricting a relative axial movement of the fixing assembly and the lock assembly.

2. The lock assembly according to claim 1, wherein the stop portion of the central pull shaft is a circular flange.

3. The lock assembly according to claim 1, wherein the first engaging portion and the second engaging portion are concave-convex structures that are complementary to each other in shape.

4. The lock assembly according to claim 1, wherein the first engaging structure and the second engaging structure form a key-groove connection.

5. The lock assembly according to claim 4, wherein the first engaging structure and the second engaging structure are a spline structure and a keyway structure respectively that are mated with each other.

6. The lock assembly according to claim 1, wherein the first engaging structure and the second engaging structure are an external thread structure and an inner thread structure that are mated with each other.

7. The lock assembly according to claim 1, wherein spring seats are disposed on both ends of the return spring respectively, and the spring seats abut against a top end of the casing and a top face of the adjustment block respectively in the accommodation space.

8. The lock assembly according to claim 1, wherein a washer is disposed in the through hole at the top end of the casing.

9. The lock assembly according to claim 1, wherein the stop end plate engages with a bottom end of the casing.

10. A power battery for new energy vehicle, wherein a battery housing of the power battery is provided with the lock assembly according to claim 1.

11. A battery lock-up mechanism, wherein the battery lock-up mechanism comprises a lock assembly adapted to be connected to a battery housing of a power battery for new energy vehicle, wherein the lock assembly is the lock assembly according to claim 1, and the battery lock-up mechanism further comprises the fixing assembly adapted to be connected to the new energy vehicle.

12. The battery lock-up mechanism according to claim 11, wherein the fixing assembly comprises a fixing frame and a locking plate, the locking plate is assembled to the new energy vehicle through the fixing frame, and the second connection structure is formed on the locking plate.

13. A new energy vehicle, characterized in that the new energy vehicle comprises a power battery assembled using the battery lock-up mechanism according to claim 11.

14. The new energy vehicle according to claim 13, wherein the lock assembly is fixed to the power battery through an intermediate connector, the lock assembly is connected inside the intermediate connector through interference fit, and the intermediate connector is fixed to a battery housing of the power battery by welding.

15. The new energy vehicle according to claim 14, wherein the intermediate connector is a circular sleeve which is welded inside a bore in the battery housing.

16. The new energy vehicle according to claim 14, wherein the intermediate connector is a cast bracket adapted to be welded to a side face of the battery housing, and the cast bracket has a bore for accommodating the lock assembly.

17. The new energy vehicle according to claim 13, wherein the new energy vehicle is a new energy automobile, and the fixing assembly is connected to a chassis of the body of the new energy automobile.

18. A method for installing/detaching a power battery onto/from a new energy vehicle by using the battery lock-up mechanism according to claim 11, wherein the installing steps comprise: (1) aligning the power battery having the lock assembly for the battery lock-up mechanism with the fixing assembly on the new energy vehicle; (2) pushing the adjustment block upward so that the adjustment block is disengaged from the stop end plate, and then turning the adjustment block so as to drive the central pull shaft to engage with the locking plate; and (3) releasing the adjustment block when an appropriate locking angle or torque is reached so that the return spring pushes the adjustment block to return to a position for engaging with the stop end plate, thus restricting turning of the central pull shaft; and/or the detaching steps comprise: (1) pushing the adjustment block upward so that the adjustment block is disengaged from the stop end plate, and then turning the adjustment block so as to drive the central pull shaft to be disengaged from the locking plate; (2) releasing the adjustment block after the central pull shaft is disengaged from the locking plate so that the return spring pushes the adjustment block to return to a position for engaging with the stop end plate, thus restricting turning of the central pull shaft; and (3) moving the power battery having the lock assembly away from the fixing assembly.

19. A battery lock-up mechanism, characterized in that the battery lock-up mechanism comprises a lock assembly adapted to be connected to a battery housing of a power battery for new energy vehicle, wherein the lock assembly is the lock assembly according to claim 2, and the battery lock-up mechanism further comprises the fixing assembly adapted to be connected to the new energy vehicle.

20. A method for installing/detaching a power battery onto/from a new energy vehicle by using the battery lock-up mechanism according to claim 12, wherein the installing steps comprise: (1) aligning the power battery having the lock assembly for the battery lock-up mechanism with the fixing assembly on the new energy vehicle; (2) pushing the adjustment block upward so that the adjustment block is disengaged from the stop end plate, and then turning the adjustment block so as to drive the central pull shaft to engage with the locking plate; and (3) releasing the adjustment block when an appropriate locking angle or torque is reached so that the return spring pushes the adjustment block to return to a position for engaging with the stop end plate, thus restricting turning of the central pull shaft; and/or the detaching steps comprise: (1) pushing the adjustment block upward so that the adjustment block is disengaged from the stop end plate, and then turning the adjustment block so as to drive the central pull shaft to be disengaged from the locking plate; (2) releasing the adjustment block after the central pull shaft is disengaged from the locking plate so that the return spring pushes the adjustment block to return to a position for engaging with the stop end plate, thus restricting turning of the central pull shaft; and (3) moving the power battery having the lock assembly away from the fixing assembly.

* * * * *